United States Patent
Son et al.

(10) Patent No.: US 11,229,841 B2
(45) Date of Patent: Jan. 25, 2022

(54) READER PARTICIPATION TYPE ELECTRONIC BOOK SYSTEM USING MODULE AND OPERATION METHOD

(71) Applicant: LUXROBO CO.,LTD., Seoul (KR)

(72) Inventors: Seungbae Son, Seoul (KR); Yoonsang Jung, Seoul (KR); Huijae Park, Seoul (KR)

(73) Assignee: LUXROBO CO., LTD., Seoul (KR)

(*) Notice: Subject to any disclaimer, the term of this patent is extended or adjusted under 35 U.S.C. 154(b) by 85 days.

(21) Appl. No.: 16/928,189

(22) Filed: Jul. 14, 2020

(65) Prior Publication Data

US 2021/0213356 A1   Jul. 15, 2021

Related U.S. Application Data

(63) Continuation of application No. PCT/KR2020/003096, filed on Mar. 5, 2020.

(30) Foreign Application Priority Data

Jan. 14, 2020 (KR) .................. 10-2020-0004579

(51) Int. Cl.
    *A63F 13/46* (2014.01)
    *A63F 13/211* (2014.01)
    *A63F 13/213* (2014.01)
    *A63F 13/23* (2014.01)
    *A63F 13/24* (2014.01)
    *G09B 5/06* (2006.01)
    *A63F 13/215* (2014.01)
    (Continued)

(52) U.S. Cl.
    CPC .......... *A63F 13/46* (2014.09); *A63F 3/00643* (2013.01); *A63F 13/21* (2014.09); *A63F 13/211* (2014.09); *A63F 13/213* (2014.09); *A63F 13/215* (2014.09); *A63F 13/23* (2014.09); *A63F 13/24* (2014.09); *A63F 13/245* (2014.09); *G09B 5/06* (2013.01); *A63F 2003/00359* (2013.01); *A63F 2003/00662* (2013.01); *A63F 2300/632* (2013.01); *A63H 2200/00* (2013.01)

(58) Field of Classification Search
    None
    See application file for complete search history.

(56) References Cited

U.S. PATENT DOCUMENTS 10,857,450 B1* 12/2020 Aman ................... A63F 13/214
2015/0133023 A1*  5/2015 Lewis ................... A63H 33/26
                                                                  446/91

(Continued)

*Primary Examiner* — Jason T Yen
(74) *Attorney, Agent, or Firm* — Dinsmore & Shohl LLP; Yongsok Choi, Esq.

(57) ABSTRACT

The present invention relates to a reader participation type electronic book system using a module including a module assembly configured by assembling a plurality of modules, and a user terminal connected to the module assembly through a network, which includes: a story providing unit transmitting an electronic book database including at least one story to the user terminal; an assembly information reception unit receiving module assembly information based on at least one quest performing information generated with respect to scenes constituting the story and generated for a story progress; and a score generation unit generating a score for module assembling of a user for each scoring condition with respect to the module assembly information.

24 Claims, 12 Drawing Sheets

(51) Int. Cl.
*A63F 13/21* (2014.01)
*A63F 3/00* (2006.01)
*A63F 13/245* (2014.01)

(56) References Cited

U.S. PATENT DOCUMENTS

2016/0101370 A1* 4/2016 Madsen .................... A63F 3/04
  446/91
2016/0310861 A1* 10/2016 Hirata ................... A63F 13/327
2018/0280822 A1* 10/2018 Murthy .................. A63H 33/26
2019/0217194 A1* 7/2019 Yeh ....................... A63F 13/798

* cited by examiner

FIG. 12

| MODULE ID | TIER | LOWER CONNECTION MODULE | CONNECTION RANKING | CONNECTION DIRECTION | MODULE CATEGORY |
|---|---|---|---|---|---|
| CONTROL MODULE #1 | 1 | MODULE #1 | 1 | 1 | CONTROL |
| | | CONTROL MODULE #2 | 2 | 2 | |
| | | MODULE #2 | 3 | 3 | |
| MODULE #1 | 2 | CONTROL MODULE #3 | 4 | 3 | NETWORK |
| | | MODULE #4 | 5 | 2 | |
| CONTROL MODULE #2 | 2 | MODULE #5 | 6 | 3 | CONTROL |
| MODULE #2 | 2 | MODULE #6 | | 2 | INPUT |
| CONTROL MODULE #3 | 3 | none | - | - | CONTROL |
| MODULE #4 | 3 | MODULE #7 | 7 | 3 | INPUT |
| MODULE #5 | 3 | none | 8 | - | OUTPUT |
| MODULE #6 | 3 | MODULE #8 | 9 | 2 | OUTPUT |
| MODULE #7 | 4 | none | 10 | - | INPUT |
| MODULE #8 | 4 | none | 11 | - | OUTPUT |

READER PARTICIPATION TYPE ELECTRONIC BOOK SYSTEM USING MODULE AND OPERATION METHOD

CROSS-REFERENCE TO RELATED APPLICATION

This application is a continuation of International Application No. PCT/KR2020/003096 filed on Mar. 5, 2020, which claims priority to Korean Patent Application No. 10-2020-0004579 filed on Jan. 14, 2020, the entire contents of which are herein incorporated by reference.

TECHNICAL FIELD

The present invention relates to a reader participation type electronic book system using a module and a manufacturing method thereof, and more particularly, to a reader participation type electronic book system using a module, which can effectively increase participation and interest of a reader as the reader implements a story of a book using the module, and a manufacturing method thereof.

BACKGROUND ART

In recent years, various module based fabricating tools for education, hobby, research, production, etc., have been proposed. Modules included in the fabricating tools may perform specific functions, respectively and are provided to be connected to each other to form a module assembly. In this case, respective modules may be provided to be also electrically connected to each other to transmit/receive energy, signals, data, etc. A reader can fabricate a module assembly that performs a specific purpose by assembling modules according to a provided manual or an autonomously created scheme.

As one example, Patent Document 1 (Korean Patent Registration No. 1761596) discloses a module assembly fabricated by assembling various types of modules including a network module, a driving module, a sensor module, and the like. In this case, the module assembly may be utilized for various purposes such as an educational kit which allows students or readers to appreciate an operational principle of an electronic device while assembling modules 10, 20, 30, and 40, or a research kit used for fabricating a device for a researcher to perform a specific purpose, and a toy kit which is capable of being assembled by the reader for a hobby.

Various persons including students, normal persons, and the like in addition to the researcher which is a software or hardware specialist use the module assemblies as mentioned above. However, except for the specialist, it may be difficult for the normal persons or students to assemble respective module assemblies so that the modules operate normally and prepare and use software suitable for driving the assembled module assemblies, and as a result, there may be a restriction on dissemination of the module.

In particular, since coding such as logic operations on signals generated by various hardware such as a sensor or a button should use various application program interfaces (APIs), the coding may be coding techniques having a high difficulty level for general persons or students. Accordingly, a system is required, which facilitates an access to coding by using a module connected to an electronic book.

SUMMARY

Technical Problem

The present invention is contrived to cope with the technical problem and an object of the present invention is to provide a reader participation type electronic book system using a module, which can effectively increase participation and interest of a reader as the reader implements a story of a book using the module, which can substantially compensate various problems which occur due to limitations and disadvantages in the related art.

Technical Solution

According to an embodiment of the present invention, a reader participation type electronic book system, using a module including a module assembly configured by assembling a plurality of modules, and a user terminal connected to the module assembly through a network, may include: a story providing unit transmitting an electronic book database including at least one story to the user terminal; an assembly information reception unit receiving module assembly information based on at least one quest performing information generated with respect to scenes constituting the story and generated for a story progress; and a score generation unit generating a score for module assembling of a user for each scoring condition with respect to the module assembly information.

According to an embodiment of the present invention, the quest performing information may include a description forming the story and an instruction to be solved by module coupling and a required module coupled to perform a quest may be previously determined according to the instruction.

According to an embodiment of the present invention, quest performing information may include an event element which is irrespective of the progress of the story and generated by a module which is arbitrarily selected and assembled by the user.

According to an embodiment of the present invention, the reader participation type electronic book system may further include a hidden story generation unit generating a hidden story which is irrespective of the story by the event element.

According to an embodiment of the present invention, the scoring condition may include at least one of a time spent when the user assembles the module assembly, module information for the type of connected module, whether the module operates, activated story information, whether to implement a code, quickness, whether the modules cooperate with each other, and a code implementation time.

According to an embodiment of the present invention, the activated story information may be a length of a story line generated based on module assembling.

According to an embodiment of the present invention, the score generation unit may add the score by giving a weight for each item with respect to the scoring condition.

According to an embodiment of the present invention, the score generation unit may generate the score by according to the predetermined weight with respect to the scoring condition.

According to an embodiment of the present invention, the story providing server may set a reference time for the module assembling differently so as to be in proportion to a difficulty based on the difficulty of the story.

According to an embodiment of the present invention, the reader participation type electronic book system may further include an event element generation unit receiving mission performing information for determining whether the user performs a mission for the event element; and an event information reception unit receiving event performing information of the user for the event element.

According to an embodiment of the present invention, the story providing server may further include a source code generation unit generating a source code based on the module assembly information.

According to an embodiment of the present invention, the module assembly may include at least one of an input module and an output module, the input module may be at least one of an environment module, a button module, a gyroscope module, a mic module, an infrared module, a dial module, and an ultrasound module, and the output module may be at least one of an LED module, a speaker module, a display module, a motor controller module, and a motor module.

According to an embodiment of the present invention, a next quest output after the quest may be determined by considering at least one of a surplus module combined by the user, and module sequence from topology and/or programmed source code irrespective of the quest.

According to an embodiment of the present invention, when the module is assembled with respect to the next quest, the module may be assembled after initializing module assembling for a previous quest performed just before the next quest.

According to an embodiment of the present invention, the network may be connected wiredly and/or wirelessly.

According to an embodiment of the present invention, each of the plurality of modules may include module unique information which is a module unique identifier and the module assembly may include at least one set unique information for distinguishing the user.

Further, according to an embodiment of the present invention, an operation method of an electronic book system using a module including a plurality of modules may include: transmitting, by a story providing unit, an electronic book database including at least one story to a user terminal; receiving, by an assembly information reception unit, module assembly information based on at least one quest performing information generated with respect to scenes constituting the story and generated for a story progress; and generating, by a score generation unit, a score for module assembling of a user for each scoring condition with respect to the module assembly information.

The solving means of the problem according to the present invention is not limited by the contents exemplified above, and other various effects are included in the present specification.

Advantageous Effects

The following effects are at least achieved by embodiments of the present invention.

According to the present invention, when a reader assembles a module to produce various stories, an event element is added to evaluate an achievement speed and an achievement rate for an event, thereby enhancing a concentration and enhancing a quickness by increasing an interest of the reader.

According to the present invention, in the progress of a story, visuals, hearings, etc., are output through a module to increase an understanding level of the reader for the story and the reader variously autonomously produces the story to cause continuous interest by increasing a participation level of the reader.

According to the present invention, the reader receives a feedback of source code information for an assembled module while performing an event element for the story to increase an interest level for coding and guarantee a learning result at a predetermined level or higher.

According to the present invention, an electronic fairy tale book having various stories is connected to the module and used to increase the utility of a product.

According to the present invention, all processes of coding in which the module is assembled are scored to enhance competitiveness among users and create various creative stories.

The effects according to the present invention are not limited by the contents exemplified above, and other various effects are included in the present specification.

DESCRIPTION OF DRAWINGS

FIG. 12 is a table for describing topology information according to an embodiment of the present invention.

DETAILED DESCRIPTION

Figure 1:
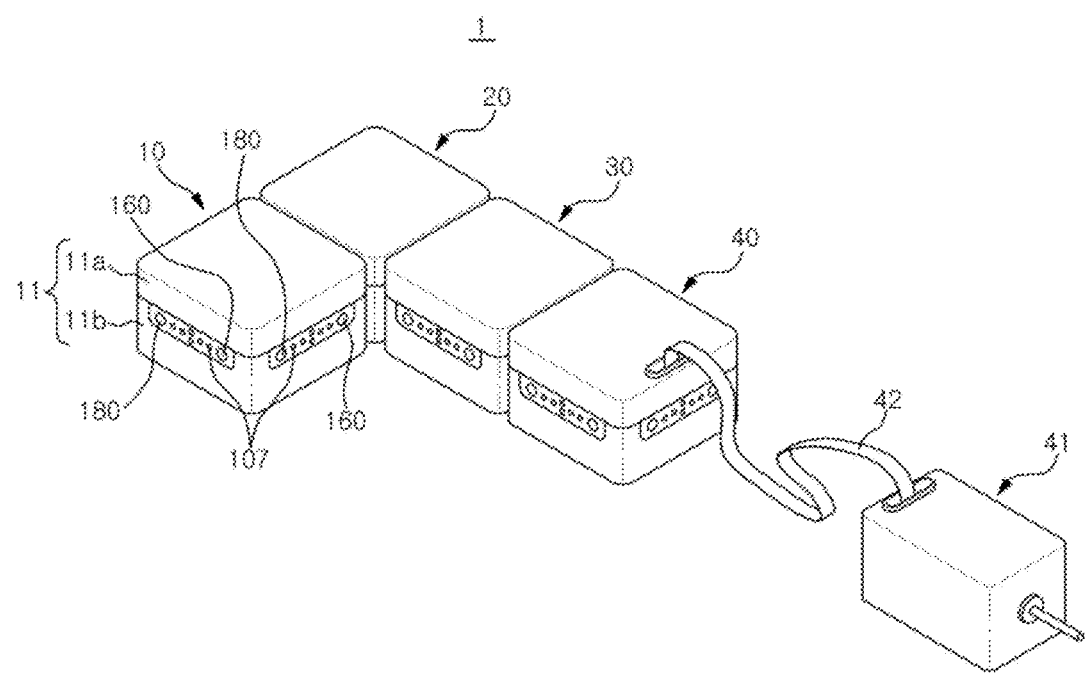
FIG. 1 is a perspective view illustrating a state where a module assembly is assembled according to an embodiment of the present invention.

Advantages of the present invention and methods for accomplishing the same will be more clearly understood from embodiments described in detail below with reference to the accompanying drawings. However, the present invention is not limited to the following embodiments but may be implemented in various different forms. The embodiments are provided only to make description of the present invention complete and to fully provide the scope of the present invention to a person having ordinary skill in the art to which the present invention pertains, and the present invention will be just defined by the appended claims.

The shapes, sizes, ratios, angles, numbers, and the like illustrated in the drawings for describing the embodiments of the present invention are merely examples, and the present invention is not limited thereto. Further, in describing the present invention, a detailed explanation of known related technologies may be omitted to avoid unnecessarily obscuring the subject matter of the present invention. The terms such as "including," "having," and "consisting of" used herein are generally intended to allow other components to be added unless the terms are used with the term "only". In a case where a component is expressed as a singular, the case includes a case where the component is expressed as plural unless expressly stated otherwise.

Components are interpreted to include an error range even if not expressly stated.

The features of various embodiments of the present invention can be partially or entirely bonded to or combined with each other and can be interlocked and operated in technically various ways to be sufficiently appreciated by those skilled in the art, and the embodiments can be carried out independently of or in association with each other.

Hereinafter, a module assembly according to an embodiment of the present invention will be described in detail with reference to FIGS. 1 and 2.

FIG. 1 is a perspective view illustrating a state where a module assembly is assembled according to an embodiment of the present invention. FIG. 2 is a plan view illustrating an internal structure of a module according to an embodiment of the present invention.

Referring to FIG. 1, a module assembly 1 is constituted by a plurality of modules 10, 20, 30, and 40 which may be assembled with each other.

In the embodiment, the module assembly 1 may be defined as a set of one or more modules 10, 20, 30, and 40 which may be assembled to each other or a structure in which the modules 10, 20, 30, and 40 are assembled and is not limited by a purpose, a type, a form, the number of modules, etc. For example, the module assembly 1 may be a part of an educational kit which allows a student or a reader to appreciate an operational principle of an electronic device while assembling the modules. Alternatively, the module assembly 1 may be a part of a research kit which a researcher uses for fabricating a device for performing a specific purpose. Alternatively, the module assembly 1 may be a part of a toy kit which the reader may assemble for a hobby.

For easiness of description, in the embodiment, an example in which the module assembly 1 is constituted by four modules 10, 20, 30, and 40 as illustrated in FIG. 1 is described and the four modules will be referred to as a first module 10, a second module 20, a third module 30, and a fourth module 40, respectively.

A plurality of modules 10, 20, 30, and 40 may be defined as objects configured to transmit and receive a signal, data, or electrical energy (hereinafter, an 'electrical signal') represented as a change in voltage or current to and from another module or an external device. The modules 10, 20, 30, and 40 include a central processing unit (CPU), a memory, a power supply, etc., or a sensing means, a processing means, a driving means, etc., which is operable by being controlled by another module to be independently driven, respectively.

Further, the respective modules 10, 20, 30, and 40 may be configured to independently perform specific functions or perform specific functions by interaction with another module. When the modules include a central processing unit (CPU), firmware may be installed for each module. In the present specification, it is described that the first module 10 among the plurality of modules 10, 20, 30, and 40 serves as a main module and detailed contents related thereto will be described later with reference to FIG. 5.

Further, the respective modules 10, 20, 30, and 40 may be broadly classified into an input module, an output module, and a setup module.

Here, the input module may be constituted by an infrared (IF) module capable of receiving an infrared signal from a remote controller, etc., a Gyroscope sensor module capable of sensing X, Y, and Z-axis change angles and acceleration, a dial module capable of measuring a rotational angle or a rotational speed using rotation of a module handle, a button module capable of sensing pressing of a button, sensing click, double-click, and pressed states, and maintaining an on/off state using toggle, an environment module capable of measuring a temperature, humidity, illuminance, etc., a mic module capable of sensing ambient sound intensity (dB) and a frequency, and an ultrasonic module capable of sensing a distance.

The output module may be constituted by an LED module capable of visual displaying depending on a color change, a speaker module, a display module displaying a picture drawn by the reader, a text, or module information on a screen, a motor controller module setting a speed, an angle, and a torque and sending the electrical signal to a motor module, and rotating the motor module, or a motor module (motor; MDP-14) capable of converting the electrical signal received from the motor controller into a rotational motion.

The setup module may be constituted by a battery module used when supplying power to another module and a network module capable of connecting the module to a PC, a smart phone, or the module through Bluetooth, WiFi, or USB connection.

Further, the respective modules 10, 20, 30, and 40 may be connected to an external driving device 41 by a cable 42. In this case, the module assembly 1 may be a device that selectively actuates the motor by receiving the signal of the remote controller or the smart phone. A configuration of the module assembly 1 is just one example and the respective modules 10, 20, 30, and 40 may be provided to perform an arbitrary function independently or through interlocking with another module.

The modules 10, 20, 30, and 40 may be a cube having a polygonal pillar shape having a plurality of lateral surfaces which may be in face contact with another neighboring module. Here, it should be appreciated that face contact does not mean only that all dimensions of lateral surfaces contact each other and should be appreciated as a meaning including a case where only some of the lateral surfaces contact and the lateral surface of any one module and the lateral surface of another module partially contact each other while facing each other.

In the embodiment, it is illustrated as an example that the modules 10, 20, 30, and 40 have a plane having a square shape. In other words, it is illustrated as an example that the modules in the embodiment have a rectangular parallelepiped having four side surfaces. Meanwhile, as another embodiment, the modules 10, 20, 30, and 40 may be formed in polygonal pillar shapes including a planar right triangular shape, a rectangular shape, a right pentagonal shape, and the like and in particular, formed in a right polygonal shape. Some modules may have different three-dimensional shapes. Further, some of the modules may have various stereoscopic shapes including a cone, a polyhedron, and the like.

Hereinafter, a configuration of the module will be described based on the first module 10 among the plurality of modules.

Here, the first module 10 may include a housing 11 forming an exterior, a terminal 107 which is exposed to the lateral surface of the housing 11 to transfer or receive the electrical signal to another connected module, a pin installation portion 150 where a pin 180 which selectively protrudes to the outside of housing is provided, and a pin receiving portion 160 into which a pin of another module is inserted.

Meanwhile, one side surface of the first module 10 may include a serial port capable of communicating with an external device. For example, the serial port may use ports of various standards capable of performing wired serial communication such as Universal Serial Bus (USB), USB-C type, IEEE 1394, Thunderbolt, etc.

A housing 11 as a case formed in a rectangular parallelepiped shape in which a flat surface is square protects internal components. As illustrated in FIG. 1, the housing 11 may be provided in a form in which an upper case 11a and a lower case 11b are coupled to each other. In a method for configuring the housing 11, the upper case 11a and the lower case 11b may be integrally formed or divided into more parts and assembled as necessary.

A terminal 107 may transfer the electrical signal to another connected module or receive the electrical signal from another module and as one example, may receive the electrical signal from a substrate 102 provided in the housing 11 and transfer the electrical signal to the terminal of another module which contacts the terminal. The terminal 107 may have multiple contact points or connection pins and may have various shapes according to a transferring method of the electrical signal, a standardized specification, and the like.

Such a terminal 107 may be disposed on one lateral surface of the housing 11 by forming one set with the pin 180, the pin installation portion 150, and the pin receiving portion 160. Specifically, the terminal 107 may be disposed between the pin 180 and the pin receiving portion 160 and may contact the terminal disposed between the pin and the pin receiving portion of another module.

In the embodiment, it is described as an example that the terminal 107 is provided on all lateral surfaces of the housing 11, but there may be a lateral surface without the terminal 107 in some embodiments.

Figure 2:
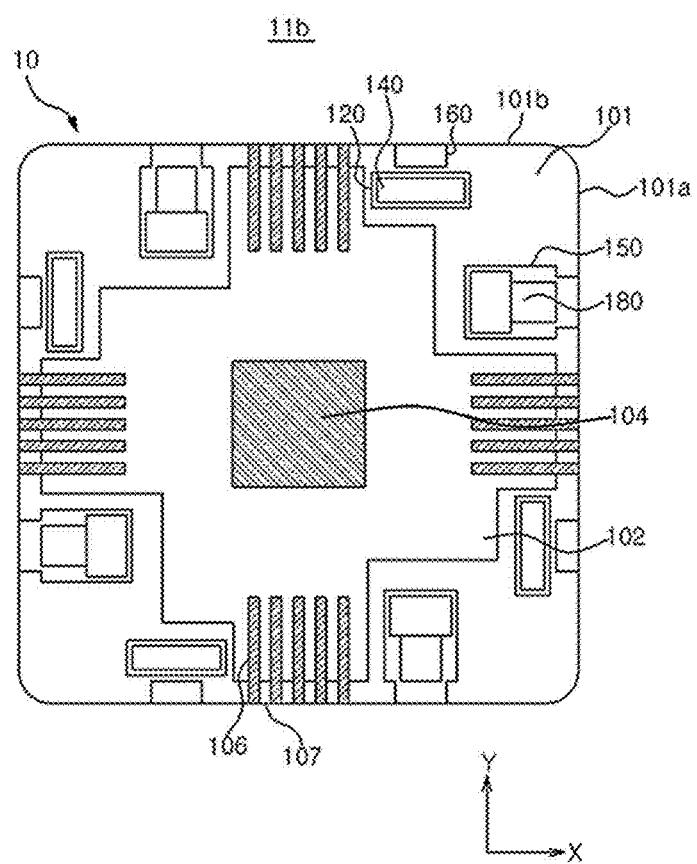
FIG. 2 is a plan view illustrating an internal structure of a module according to an embodiment of the present invention.

Referring to FIG. 2, the lower case 11b may include a frame 100 forming the exterior and the internal structure, a substrate 102 provided inside the frame 100, and a functional unit 104 installed on the substrate 102.

The frame 100 as a structure that configures a part or the entirety of the housing 11 may form the exterior of a part or the entirety of the housing 11 and provide a space and a structure for installing various components therein. In the embodiment, it is described as an example that the frame 100 forms the lower case 11b of the housing 11, but the scope of the present invention is not limited thereto. Further, in the embodiment, the frame 100 is formed in a rectangular shape and has four corners 101.

The functional unit 104 for implementing the function of the first module 10 may be mounted on the substrate 102 and may be fixedly installed in an inner space center of the frame 100. The functional unit 104 may include, for example, a microprocessor 105 and in this case, when the first module 10 is driven by independent firmware, the functional unit 104 may be provided in order to control the first module 10.

As another example, when the first module 10 is an infrared sensor module, the functional unit 104 may include required devices such as an infrared sensor and an analog digital converter (ADC) required for processing a value sensed by the infrared sensor and an interface required for communication with another module or external hardware, e.g., a communication interface such as I2C, UART, or USB.

As such, the types of modules 10 to 40 of the present invention may be determined according to the function of the functional unit 104.

As yet another example, the functional unit 104 may include the microprocessor 105 and the memory and becomes a control module when the functional unit 104 includes an OS or firmware capable of controlling other units.

Alternatively, the functional unit 104 becomes the sensor module when being capable of transferring the sensed value of the sensor to another module or the external device.

Alternatively, the functional unit 104 may become a communication module when being capable of transmitting the electrical signal to another external device through the wired/wireless communication device by receiving the electrical signal from another module while including various wired/wireless communication devices including NB-IOT, LTE, LoRa, WiFi, Bluetooth, USB, a cable modem, etc.

Alternatively, the functional unit 104 may become a driving module when being actuatable while including various actuators including the motor and the like and actuator control circuits. Other more detailed structures and combinations of the modules of the present invention are disclosed in detail in Korean Patent No. 10-1761596 and included in the specification of the present invention by reference.

Hereinafter, a reader participation type electronic book system according to an embodiment of the present invention will be described with reference to FIG. 3.

Figure 3:
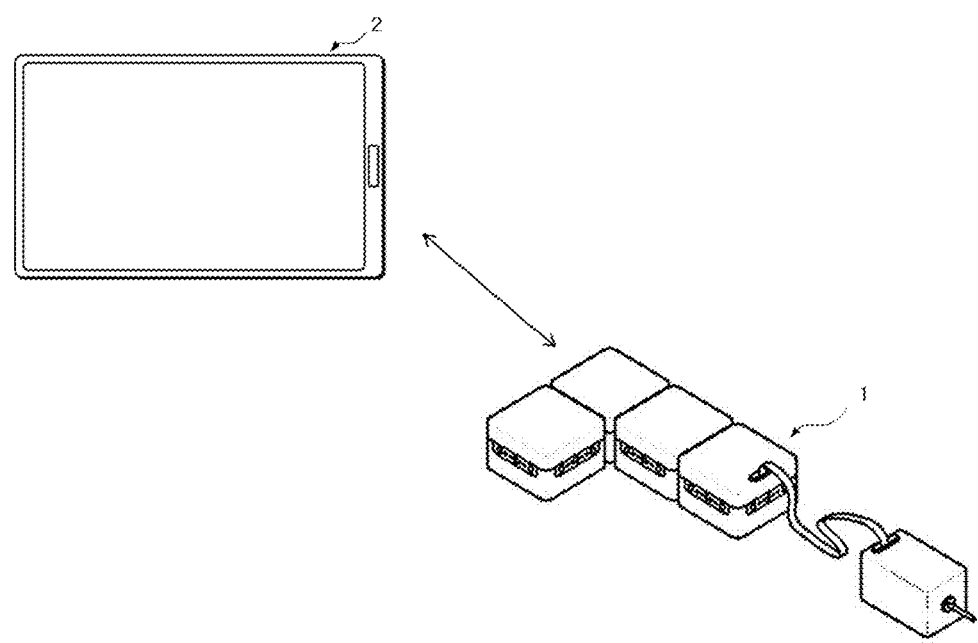
FIG. 3 is a schematic view illustrating a reader participation type electronic book system using a module according to an embodiment of the present invention.

FIG. 3 is a schematic view illustrating a reader participation type electronic book system using a module according to an embodiment of the present invention.

Referring to FIG. 3, the reader participation type electronic book system using a module may include a module assembly 1 and a user terminal 2. In this case, the module assembly 1 may be connected to the user terminal 2 through a network such as the Internet, an intranet, or a broadband communication network. Alternatively, the module assembly 1 may be directly connected to the user terminal 2 through wired/wireless communication, in particular, a serial port connection. Moreover, the network may include a wired short-range communication means such as USB, RS-222, and IEEE1394, a wireless short-range communication means such as WiFi and Bluetooth, and an Internet connection. In this case, the user terminal 2 may provide a writing tool capable of preparing, recommending, and compiling (or interpreting) a source code of a program capable of driving the module assembly 1. The writing tool capable of preparing, recommending, and compiling (or interpreting) the source code is disclosed in detail in Korean Patent Application Nos. 10-2018-0114166 and 10-2018-0114171 previously invented by the present applicant, which are included by reference. Meanwhile, in this specification, the reader participation type electronic book system using a module may further include a story providing server 2 connected to the module assembly 1 or the user terminal 2.

The user terminal 2 may receive assembly information from the module assembly 1 through the network and store the assembly information as a database. The source code may be generated based on the assembly information. The user terminal 2 may store as the database a module assembly assembling information history and a source code corresponding thereto, which are preconfigured in advance or already used by existing users and provide the source code based on the assembly information of the module assembly 1 of a current user and the database.

Further, the user terminal 2 determines whether an assembly error occurs based on the assembly information and provides assembly error information to the module assembly 1 and provides assembly assistance information to the module assembly 1 so as to remove, replace, and add the module. The assembly information will be described below in detail with reference to FIG. 4, etc.

Further, when the user terminal 2 provides the source code, the user terminal 2 may score an assembly time (hereinafter, also referred to as "time spent when coupling modules") of the module assembly 1, the number of used modules, the type of used module, operation information of the module, a similarity between a stored story and a generated story, and whether the module operates based on the assembly information of the module assembly 1 of the user. Here, a plurality of listed items may be referred to as a scoring condition and is not limited to the above-described type. For example, the plurality of items for the scoring condition may include a time spent when removing the module, the number of modules used when solving the same problem (in this case, the scoring condition is also referred to as "efficiency"), a time spent when replacing the module (hereinafter, also referred to as "quickness"), a case where two or more users cooperate to assemble the module or complete coding (in this case, the scoring condition is referred to as "cooperation"), etc. Detailed contents related thereto will be described later.

Further, the user terminal 2 determines whether there is the error in assembling the module assembly 1 by checking an integrity of an execution rule of the source code and provides the assembly error information to the module assembly 1. The user terminal 2 checks whether the module assembly 1 is arranged and assembled according to the execution rule by the integrity of the execution rule. The assembly error information includes at least one module unique information (module ID) with the error. The module assembly 1 outputs that there is the assembly error in a module with at least one error based on the assembly error information provided from the user terminal 2 or the story providing server 2. It is apparent to those skilled in the art that the module assembly 1 may output that there is the assembly error by flickering an LED of the module with at least one error to a predetermined color, but output that there is the assembly error by another scheme.

Further, the user terminal 2 may recommend information on a module at a location to be removed, replaced, and added and the location based on the assembly information. As described above, the user terminal 2 provides the source code based on the assembly information of the currently assembled module assembly 1 and the database. The user terminal 2 recommends information on a module at a location to be removed, replaced, and added in the module assembly 1 and the location based on the source code. In this case, the module information at the location to be added or replaced means information on a module that may perform an additional operation as compared with a current configuration by additionally attaching the module or may be replaced in the current configuration of the module assembly 1.

Further, the user terminal 2 provides to the module assembly 1 the assembly assistance information including the module information at the location to be removed, replaced, and added and the location by checking the integrity of the execution rule of the source code of the currently assembled module assembly 1. It is apparent to those skilled in the art that the module assembly 1 may output the module at the location to be removed, replaced, and added and the location by flickering the LED of the module at the location to be removed, replaced, and added to a predetermined color and in a predetermined direction, but output the module and the location by another scheme. In this case, when the user terminal 2 or the story providing server 3 or the user terminal 2 provides module information at a plurality of locations to be removed, replaced, and added and the locations, the user terminal 2 or the story providing server 3 may select preferred module information based on the external input.

Further, the user terminal 2 generates a debugging source code based on the assembly information. The user terminal 2 stores as the database a module assembly assembling information history and a debugging source code corresponding thereto, which are preconfigured in advance or already used by existing users and provides the debugging source code based on the assembly information of the module assembly 1 of a current user and the database. The user terminal 2 provides an execution file (hereinafter, referred to as firmware) acquired by compiling the debugging source code to the module assembly 1. Debugging firmware is downloaded to the module assembly 1. The debugging firmware flickers LEDs of executed modules at a predetermined speed according to the execution order of the module assembly 1. The debugging firmware may differently flicker an LED color to a predetermined color when waiting for the input order in the input module.

Further, the user terminal 2 may determine whether two or more types of set unique information (set ID) is mixed at the time of assembling the module assembly 1. In other words, based on the set unique information, it may be determined whether a plurality of users participates in assembling the module assembly 1 in one module assembly at the time of assembling the module assembly 1. For example, when first set unique information and second set unique information are included in one module assembly 1, it may be determined that two users participate in assembling. In other words, when one user assembles the module, one set unique information (set ID) is generated in the module assembly 1 and when a plurality of users assembles the module, a plurality of set IDs is generated in the module assembly 1. As a result, when at least two set unique information (set IDs) is included in one module assembly 1, the user terminal 2 may determine that the plurality of users participates in assembling the module and consider the determination and reflect the determination to a score at the time of generating the score. For example, whether the users cooperate is added to a plurality of items as the scoring condition and reflected to the score or the score is separately granted for each user to promote competitiveness between the users.

Hereinafter, a configuration and an operation of the story providing server 2 according to an embodiment of the present invention will be described in detail with reference to FIG. 4.

Figure 4:
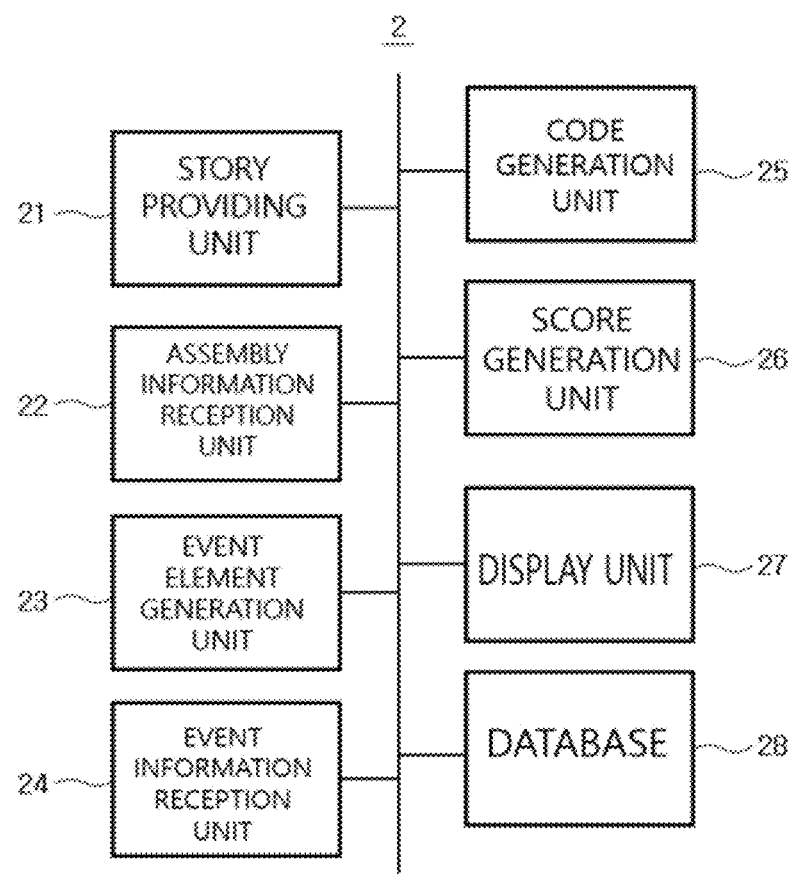
FIG. 4 is a block diagram illustrating a configuration of a story providing server according to an embodiment of the present invention.

FIG. 4 is a block diagram illustrating a configuration of a story providing server according to an embodiment of the present invention.

Referring to FIG. 4, the story providing server 2 includes a story providing unit 21, an assembly information reception unit 22, an event element generation unit 23, an event information reception unit 24, a code generation unit 25, a score generation unit 26, a display unit 27, and a database 28.

The story providing unit 21 is a component that transmits at least one story to the user terminal in an electronic book type. The electronic book may provide a story constituted by a plurality of scenes. In this case, the story may be a story having various endings and detailed contents related thereto will be described later. Meanwhile, the database 28 may be referred to as an electronic book database. Detailed contents regarding a connection relationship between respective stories and modules will be described later.

Further, at least one scene constituting the story may include story information configured by a type of one of a text, a picture, and a moving picture or at least one combination. Here, the text may be provided in units of words, sentences, and paragraphs and displayed in the display unit 27. Further, the scene may include a story region in which the story information is displayed and a quest region in which quest information on a current scene is displayed and a location of each region may be changed according to an embodiment. In this case, detailed contents regarding the story region and the quest region will be described below.

The assembly information reception unit 22 is a component which receives information (hereinafter, also referred to as "module assembly information") on the module assembled when a module is assembled, which corresponds to one quest performing information selected among at least one quest performing information related to the story included for each scene (or for each of some scenes). Here, the quest performing information is preferably appreciated as an element for the story progress as an element for the progress of the story and a connection between quests depending on selection of the quest performing information is a story line.

The event element generation unit 23 is a component that provides an event element related to the story included in the scene to the user terminal and a hidden story may be generated with the assembling of the event element. Further, the event element may request a motion operation other than only module assembling so as to cause an interest of the user in progressing the story. For example, when a warrior encounters a dragon, an event element such as "Smash the dragon out by shouting at a predetermined dB (decibels) or higher by using a mic module" may be provided to the user. In this case, the event element may be output as the text through the display unit 27 of the user terminal or output as a voice through a speaker unit of the user terminal. Meanwhile, the hidden story is not limited to being generated by assembling the event element and may be generated as the user assembles a predetermined module (hereinafter, also referred to as a "module which may be omitted in the progress of the story") which is irrespective of the progress of the story.

As a result, the event information reception unit 24 is a component that receives information (hereinafter, also referred to as "event performing information") that the user performs a mission for the event element by using a specific module and the user terminal completes performing the mission when performing the mission is completed (i.e., when the user completes assembling the corresponding module).

Meanwhile, in the present invention, the story providing server may include a separate hidden story generation unit that generates the hidden story by the event element irrespective of the story according to an embodiment.

The code generation unit 25 is a component that generates the source code based on the module assembly information. The code generation unit 25 may preconfigure the source code in advance or store as the database 28 a module assembly assembling information history and a source code corresponding thereto or already used by existing users and provide the source code based on the assembly information of the module assembly 1 of a current user and the database 28.

The score generation unit 26 is a component that compares assembly information on a module assembled from the current user based on the database 28 storing the module assembly information on the story and generates the score according to a plurality of scoring conditions in all processes. Further, the score generation unit 26 generates the score based on a predetermined weight for the module assembly information. Here, in respect to the predetermined weight, the weight may be set for each ratio with respect to any one or more conditions among a plurality of module assembly information including a time spent when assembling the module, the number of types of used modules, the number of used modules, a similarity with the stored story, and the like. For example, the time spent when assembling the module is short, the weight may be set, as the number of types of used modules is small (or large), the weight may be set, as the number of used modules is large (or small), the weight may be set, or as the similarity with the story stored in the database 28 is high, the weight may be set. Further, the score generation unit 26 may evaluate completeness by generating the score by assigning the weight based on a time spent until the assembling is completed, the number of combination times, the number of removal times, and statistics stored in the server compared with the statistics. Further, the score generation unit may evaluate efficiency by generating the score based on the number of modules used when solving the same problem. Further, the score generation unit 26 may evaluate the similarity by comparing the similarity of the pattern based on a database storing a solving method depending on a problem by assigning the weight to an example in which the pattern is disposed similarly (or dissimilarly) to a pattern close to a preferable story, for example, previously stored in the server. Further, the score generation unit 26 may evaluate the cooperativeness by generating the score by assigning the weight when two or more users cooperate with each other to assemble the module or complete coding. In this case, the cooperativeness will be described later with reference to FIG. 6. Further, the score generation unit 26 may evaluate the quickness by measuring a time required for replacing a module limited by a manager with another module or measuring a time required for replacing an input module/output module which does not operate with a replacement module. However, besides, various cases may be included and the present invention is not limited thereto.

The display unit 27 is a component that performs an output in various types including an image, a video, and the like by connecting the story information, the quest performing information, the event element, etc., to a smart phone, a computer, or a dedicated display. Here, the story information may mean a title of the story, a writer of the story, a length of the story, etc. The quest performing information may mean a component that allows the user to progress the story through module assembling.

The database 28 may store a genre of the story, writer information of the story, a keyword, publication information, content information, etc., included in the electronic book. Alternatively, the database 28 may store and manage the module information on the module assembly 1 connected to the user terminal providing the electronic book through the wired/wireless network.

Meanwhile, it is described that the above-components operate while being included in the user terminal 2, but the components may be added according to an embodiment and may operate while being included in the story providing server connected to the module assembly 1 and the user terminal 2 through the network.

Hereinafter, a configuration and an operation of the first module 10 which operates as a main module according to an embodiment of the present invention will be described in detail with reference to FIG. 5.

Figure 5:
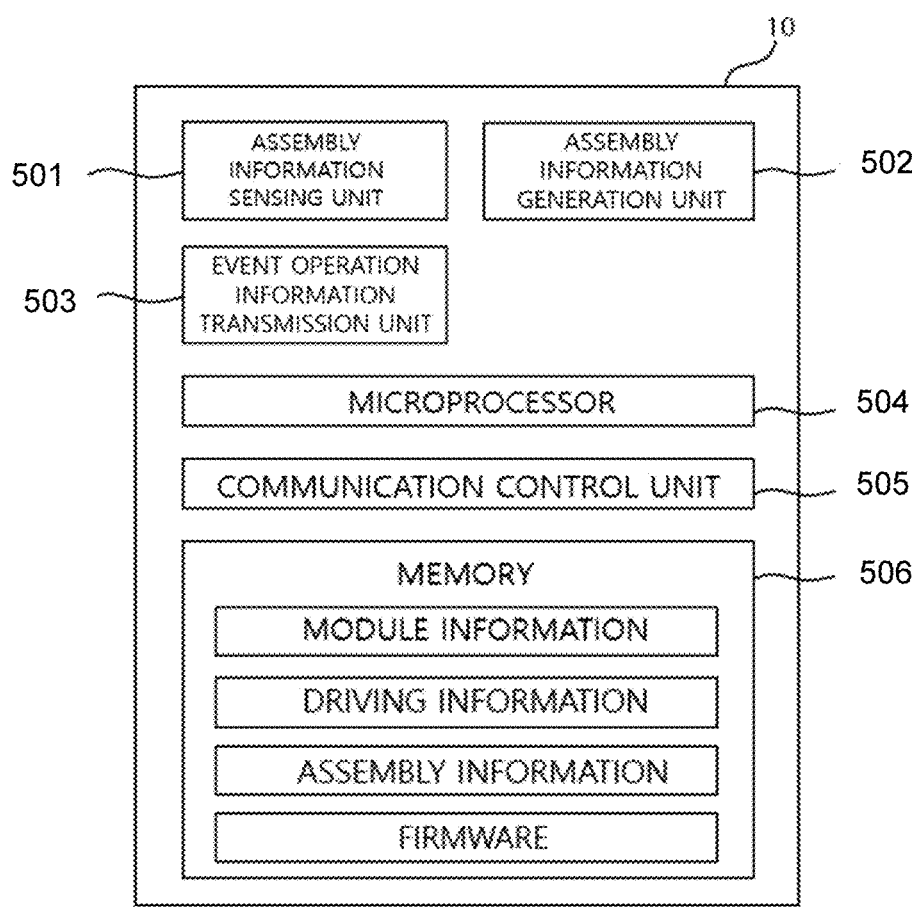
FIG. 5 is a block diagram for describing components of a main module according to an embodiment of the present invention.

FIG. 5 is a block diagram for describing components of a main module according to an embodiment of the present invention. In FIG. 5, as described above, the first module 10 is referred to as a main module 10 for convenience of description. Further, in this specification, it is described that there is one main module 10, but there may be a plurality of main modules 10.

Referring to FIG. 5, the main module 10 may be a network module that includes an assembly information sensing unit 501, an assembly information generation unit 502, an event operation information transmission unit 503, a microprocessor 504, a communication control unit 505, and a memory 506, but it is apparent to those skilled in the art that the main module 10 may serve as another module category.

The assembly information sensing unit 501 is a hardware and/or software component which may include an assembly information sensing protocol and sense the assembly information of connected modules. For example, the assembly information sensing unit 501 may sense the module unique information, the module category, the lower connection module information, and the execution category of the modules connected to the module assembly 1.

The assembly information generation unit 502 may determine the assembly information of the module assembly 1 according to the sensed assembly information and write the determined assembly information to the memory. For example, the assembly information generation unit 502 may generate the assembly information including the module unique information, the module category, the lower connection module information, and the execution category of the respective modules connected to the module assembly 1 according to the sensed assembly information.

The event operation information transmission unit 503 may perform an operation for the event element received from the user terminal 2 by using the input module and transmit the operation information to the user terminal 2. For example, the event operation information may include input information using various modules which may be an input through the mic module, an input through a dial module, and an input through a button module.

When at least some of the assembly information sensing unit 501, the assembly information generation unit 502, the event operation information transmission unit 503, and the communication control unit 505 are implemented as a software module, the microprocessor 504 executes the software module.

The communication control unit 505 may control communication with an external device and communication between the modules. The communication with the external device may include various wired/wireless communication including NB-IOT, LTE, LoRa, WiFi, Bluetooth, USB, a cable modem, etc. Meanwhile, the communication between the modules may perform inter-module communication by using various internal communication means including UART, I2C, LIN, CAN, etc. The communication control unit 505 may include various wired/wireless communication means or the communication means between the modules and perform communication by a scheme of controlling a separate network module when being connected to the separate network module.

Meanwhile, the memory 506 may include various information required for the operations of the software module which may be executed by the microprocessor 504 and the module assembly 1 and various information regarding the assembly information of the connected modules and for example, the memory 506 may include module information, driving information, assembly information, and firmware.

The module information includes at least one of the module ID, module category, functional information, and meta information.

The module ID may be a module unique identifier such as a Universally Unique identifier (UUID) or a temporary ID assigned during combination in the main module.

The module category is a concept that classifies a plurality of modules, i.e., modules having a similar function to a higher concept based on a performing function in order to assist finding replaceable modules. For example, modules for inputting the electrical signal, such as a sensor, a key, a microphone, etc., may include 'input' and an actuator, a display, an LED, etc., may include 'output' or the microprocessor and in the case of a module capable of executing a program ported by the user, a network module, a battery module, or a weight display module, 'setup', etc., may be an example of the module category.

The functional information represents a detailed function of the module and for example, the control module, the infrared sensor module, a switch module, a power supply module, and the network module may become the detailed function. In this case, the function of the module may vary depending on the configuration of the functional unit 104 in each module.

The meta information as other information of the module may become, for example, a detailed device name such as a fan and may be related keywords associated with the fan, such as 'breeze' or 'cool'.

The driving information is a driver for driving each module. The driving information may be downloaded from the user terminal 2 when the driving information is stored in the corresponding module and then provided to the control module 10 at the time of connecting the module or the control module 10 provides the module information to the user terminal 2.

The firmware as software for operating the module assembly 1 may prepare the source code through the user terminal 2 and compile the source code and then generate the compiled source code as an execution file. Alternatively, when the control module 10 provides the assembly information to the user terminal 2, the source code may be recommended from the user terminal 2 and an execution file (firmware) of compiling the recommended source code may be downloaded from the user terminal 2.

Meanwhile, the module assembly according to another embodiment of the present invention may be constituted by a plurality of control modules. In this case, the assembly information sensed and generated by each control module includes its own module unique information (module ID), module category, lower connection module information, and execution category. Each of the plurality of modules of the module assembly generates the assembly information and provides the generated assembly information to the user terminal 2 or the assembly information providing server 3 through the communication control unit.

Hereinafter, the operation of the module assembly according to an embodiment of the present invention will be described in detail with reference to FIG. 6.

Figure 6:
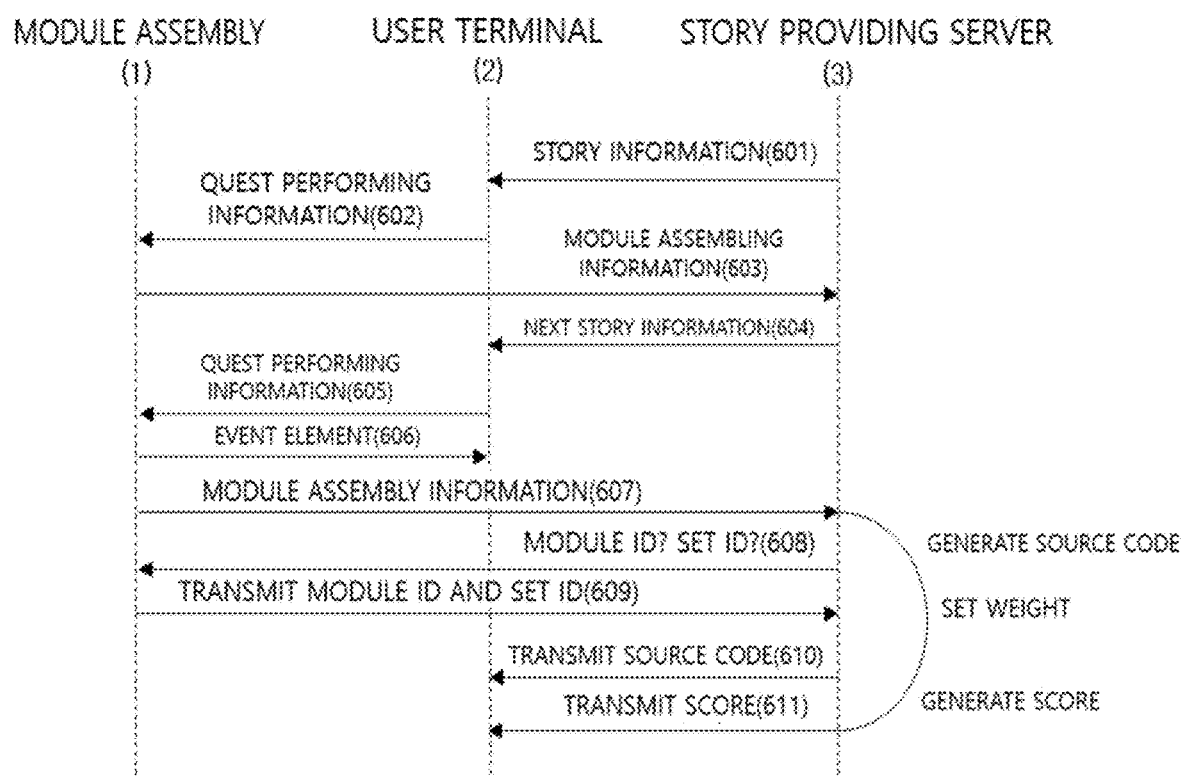
FIG. 6 is a flowchart schematically illustrating an operation of a reader participation type electronic book system according to an embodiment of the present invention.

FIG. 6 is a flowchart schematically illustrating an operation of a reader participation type electronic book system according to an embodiment of the present invention. In FIG. 6, for convenience of description, a description will be given based on the story providing server 3. Further, since respective components in FIG. 6 play the same roles as the above-described components, a duplicated description will be omitted.

Referring to FIG. 6, in step 601, when the story providing server 3 is connected to the user terminal 2, the story providing server 3 transmits a story including various story information to the user terminal 2.

In step 602, the user terminal 2 transmits module assembly request information for the quest performing information based on the received story information. As a result, the module assembly 1 receives the module assembly request information for the received quest performing information. Here, the module assembly request information may be information for requesting an input for at least one quest performing information received with respect to the story provided from the user terminal 2 and the module assembly 1 may perform the input by additionally assembling the module according to the module assembly request information.

In step 603, the story providing server 3 may receive the module assembly information based on the module assembly request information from the module assembly 1.

In step 604, the story providing server 3 that receives the module assembly information may transmit next story information to the user terminal 2 based on the module assembly information. The next story information may be defined as information on a story to be next progressed (or provided) after module assembling for one story is completed.

In step 605, the user terminal 2 transmits the module assembly request information for the quest performing information based on the received next story information. In this case, as in step 606, the user terminal 2 may receive the module assembly information for the event element generated from the module assembly 1. Meanwhile, since step 606 is a step determined by a selective operation of the user, step 606 may be omitted.

In step 607, the story providing server 3 may receive the module assembly information based on the module assembly request information from the module assembly 1. The module assembly information in step 607 is preferably appreciated as a step for next story information which occurs after step 603.

In step 608, when the story providing server 3 requests the module unique information (module ID) and the set unique information (set ID) to the module assembly 1, the module assembly 1 may transmit the module ID and the set ID to the story providing server 3 in step 609.

Figure 11:
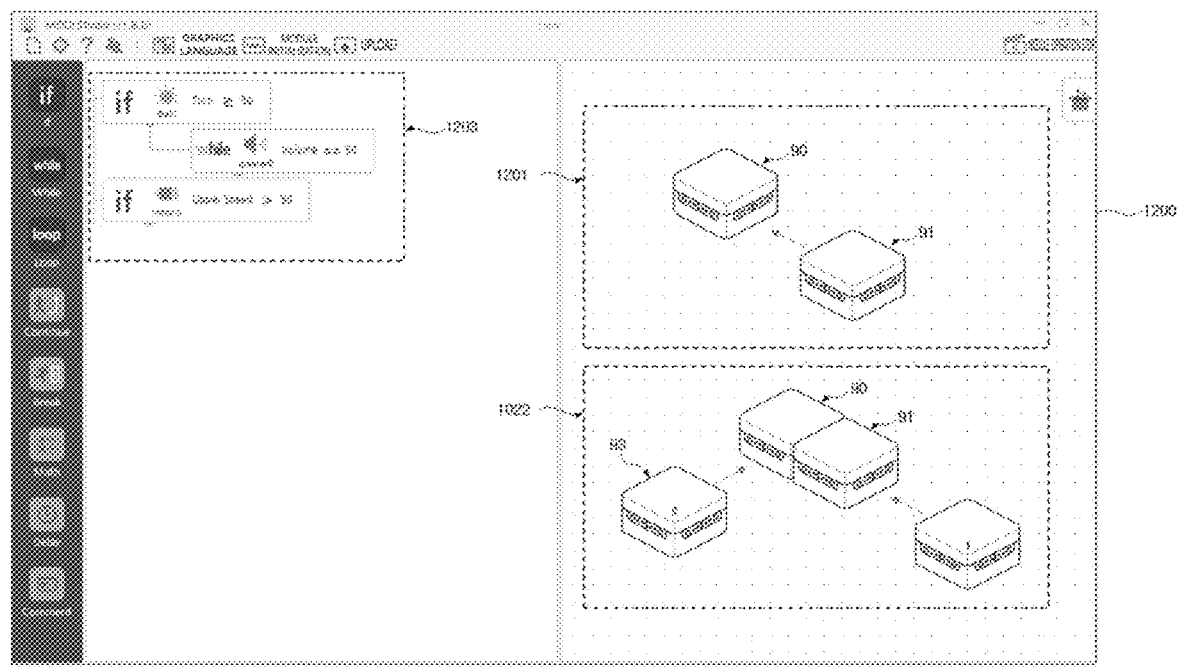
FIG. 11 is an exemplary diagram of a source code generated by assembling a module assembly according to an embodiment of the present invention.

In step 610, the source code is generated based on at least one of the module assembly information, the module ID, and the set ID and the generated source code is transmitted to the user terminal 2 to output a result through the display unit 27. As a result, the user receives a feedback of source code information for the module assembly 1 assembled as illustrated in FIG. 11 to thereby enhance appreciation and interest for coding. A detailed description related thereto will be described below with reference to FIG. 11.

In step 611, the story providing server 3 may generate the score for the module assembly 1 assembled based on the scoring condition and transmit the score given for each user or for each item to the user terminal 2.

Hereinafter, a story development sequence of the reader participation type electronic book will be described with reference to FIG. 7.

Figure 7:
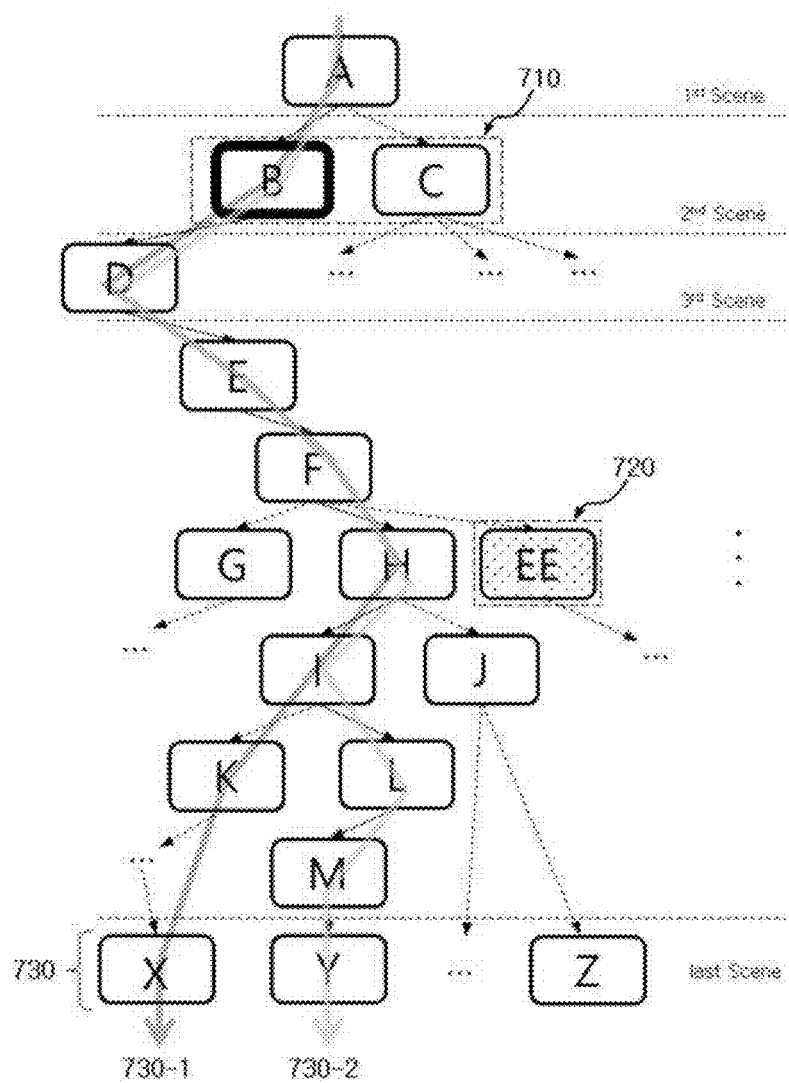
FIG. 7 is an exemplary diagram for describing an overall story a reader participation type electronic book system according to an embodiment of the present invention.

FIG. 7 is an exemplary diagram for describing an overall story a reader participation type electronic book system according to an embodiment of the present invention.

The reader participation type electronic book is an electronic book which is constituted by multiple scenes and forms various story lines X, Y, and Z according to the selection of the user. Referring to FIG. 7, each scene may include at least one quest performing information 710. Here, the quest performing information 710 is characterized to include a description forming a story for a current scene and an instruction which should be solved by module combination.

However, the user may not directly know information on the type of module to be combined in order to perform a quest through the instruction and should infer and combine the module. In other words, basically, only the instruction is provided so as for the user to infer the module at the time of assembling the module and the module to be assembled is not notified. As a result, the score of the user (or for each user) may be given based on the module assembly information of the user later. However, the quest performing information may include information on a module to be assembled by the user according to an embodiment.

For example, as illustrated in FIG. 7, assuming that in a first scene (hereinafter, also referred to as "$1^{st}$ Scene"), one quest performing information may be generated and in this case, in a second scene (hereinafter, also referred to as "$2^{nd}$ Scene"), two quest performing information 710 is generated, the user may perform only one quest between two quest performing information 710 and move to a next scene after performing both quests.

The user should particularly assemble one module in order to perform the quest performing information 710 included in each scene. The module assembled in this case may be referred to as a required module.

However, the module may be assembled separately from performing the quest performing information 710, but the module assembled in this case may be referred to as a surplus module. Here, in respect to the surplus module, a new story (hereinafter, also referred to as "hidden story") which is not related to performing the quest of the current scene, but related to the surplus module may be generated. Detailed contents related thereto will be described later.

As such, in the reader participation type electronic book, the story line may be formed by at least one module of the required module and the surplus module and various story lines may be formed according to the module assembling. As a result, various endings including X, Y, Z, and the like may be formed.

When such a process is repeated until a last scene of the story, a scene of any one of a plurality of results X, Y, and Z may be determined as a last scene 730 according to an element selected by the user.

Hereinafter, an implementation process of the reader participation type electronic book will be described in detail withy reference to FIGS. 8 to 10 and 12.

Figure 8:
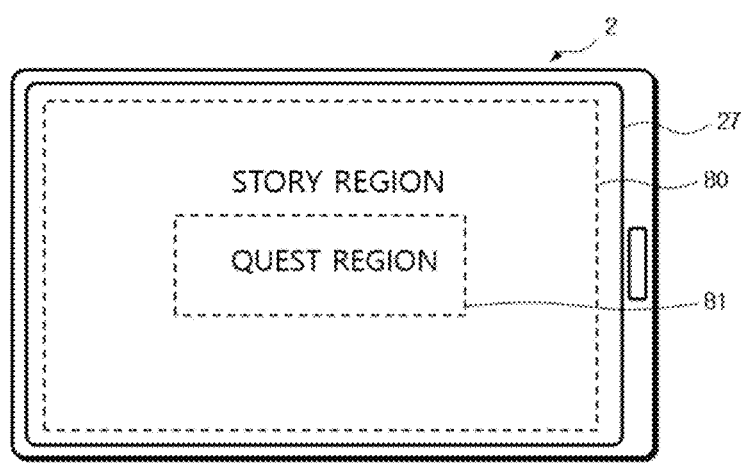
FIG. 8 is an exemplary diagram of an electronic book according to an embodiment of the present invention.
Figure 9:
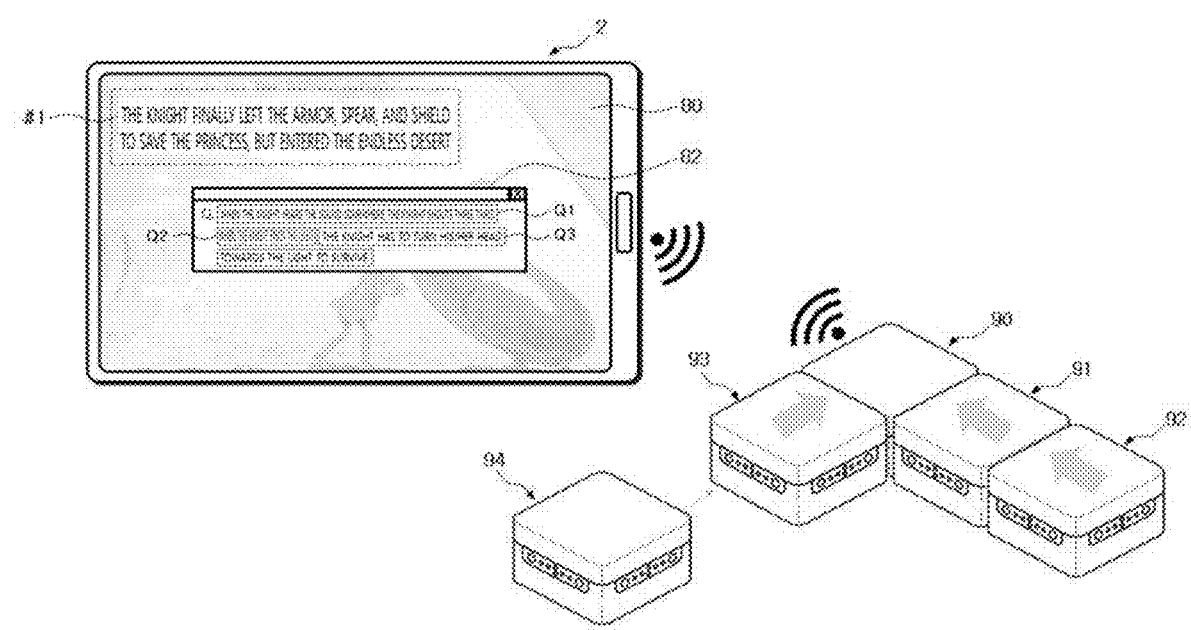
FIG. 9 is an exemplary diagram for describing a connection of a reader participation type electronic book and a module according to an embodiment of the present invention.
Figure 10:
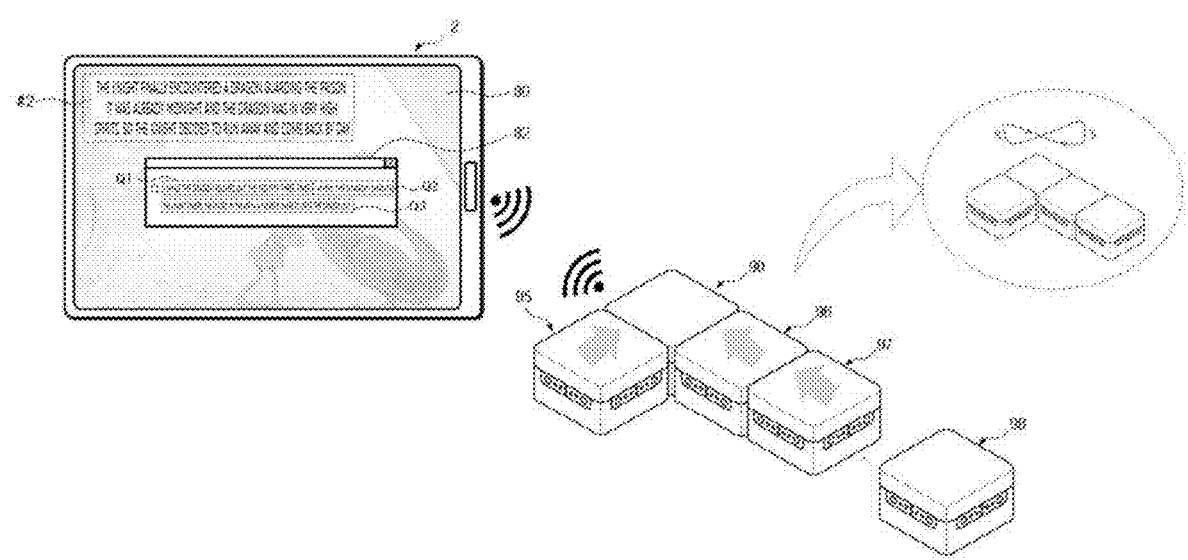
FIG. 10 is an exemplary diagram for describing a connection of a reader participation type electronic book and a module according to an embodiment of the present invention.

FIG. 8 is an exemplary diagram of an electronic book according to an embodiment of the present invention. FIGS. 9 and 10 are exemplary diagrams for describing a connection of a reader participation type electronic book and a module according to an embodiment of the present invention. FIG. 12 is a table for describing topology information according to an embodiment of the present invention. FIG. 8 exemplarily illustrates the components described in FIGS. 1 to 7, and as a result, a description thereof will not be repeated.

Referring to FIG. 8, the story is output to the display unit 27 of the user terminal 2 for each scene. The story may be displayed in a story region 80 formed in most regions of the display unit 27 and the quest performing information may be popped up in a partial region of the story region 80 and displayed in a quest region 81. However, the layout of the story region 80 and the quest region 81 may be arbitrarily changed according to a design change.

Referring to FIG. 9, a story for the first scene (#1) is displayed in the story region 80 of the user terminal 2 and a tutorial popup window 82 is generated in the quest region 81. For example, a description such as "The knight finally left the armor, spear, and shield to save the princess, but entered the endless desert." may be displayed in the story region 80 and an instruction such as "When you hear the sound somewhere, you shout three times and when you find a light, you have to turn your head towards the light to survive." may be displayed in the quest region 81.

In this case, it can be seen that the instruction includes three quests, i.e., "when the knight hears the sound somewhere, the knight shouts three times (Quest 1 (Q1)), when the knight finds a light (Quest 2 (Q2)), and "the knight has to turn his/her head towards the light to survive (Quest 3 (Q3)). For example, the required module for Quest 1 may be a mic module 91 capable of inputting the sound, the required module for Quest 2 may be a light receiving unit module 92 capable of sensing the light in order to find the light, and the required module for Quest 3 may be a motor module 93 for performing the quest for turning the head.

However, the required module is previously determined according to the quest of each scene. As a result, the user should assemble the previously determined required module by inferring the instruction. Meanwhile, a location where the required module is assembled in order to perform the quest in the instruction may be irrespective of the quest sequence.

Meanwhile, the user may attach a module (hereinafter, referred to as a "surplus module") which is irrespective of the instruction of the quest of the current scene. In this case, the surplus module is characterized in influencing the selection of the quest appearing as the required module in a next quest (hereinafter, also referred to as "next quest"). In other words, taking the instruction as an example, when the dial module 94 is combined as the surplus module irrespective of the instruction, the quest including the dial module 94 as the required module among a number of preliminary quests may be determined as a next quest $q_{n+1}$ of a current quest $q_n$.

As such, it is characterized in that the story is developed through the connection between the quests.

Next, through the dial module 94 for the next quest $q_{n+1}$, in the story region, a description such as "The knight barely arrived at the oasis and the light was on in a small house and there was a sound in it, so he approached it" may be displayed and in the quest region, an instruction such as "After pressing the doorbell three times, the knight was able to enter the house by turning the door knob. In the house, the orange candle was blinking and when the knight called the owner, the candle went out" may be displayed.

In this case, it can be seen that the instruction includes four quests, i.e., "after pressing the doorbell three times (Quest 1)", "I was able to enter the house by turning the door knob (Quest 2)", "In the house, the orange candle was blinking (Quest 3)", and "when I called the owner, the candle went out (Quest 4)". For example, the required module for Quest 1 may be a button module capable of sensing the pressing of the button and a speaker module capable of outputting a doorbell sound, the required module for Quest 2 may be a dial module capable of sensing the turning of the knob, and the required module for Quest 3 as an LED module capable of blinking an LED of a color desired by the user may display an orange LED in order to perform Quest 3. Further, Quest 4 may be performed by turning off the orange LED.

When the user combines the motor module which is irrespective of the quest of the current scene as such a process is repeated, a quest in which the motor module is included as the required module will be selected as the next quest. As a result, a quest in which a chariot appears may be selected among a plurality of preliminary quests.

Meanwhile, according to an embodiment of the present invention, a process of initializing the assembly information by separating all modules assembled in the previous scene may be accompanied in order to perform the assembling for the next quest after the next quest is output.

Referring to FIG. 10, another quest (#2 or next quest) according to an embodiment is displayed in the story region 80 of the user terminal 2. In the story region 80, a description such as "The knight finally encountered a dragon guarding the prison. It was already midnight and the dragon was in very high spirits, so the knight decided to run away and come back by day." may be displayed and in the quest region 81, an instruction such as "When the dragon shouts while belching out a red fire three times, the knight sweeps the sword in the air in a figure-8 shape to drive the dragon out." may be displayed.

In this case, it can be seen that the instruction includes three quests, i.e., "while the dragon belches out the red fire three times (Quest 1)", when the dragon shouts (Quest 2)", and "the knight sweeps the sword in the air in a figure-8 shape to drive the dragon out (Quest 3)".

For example, the required module for Quest 1 may be an LED module 95 capable of blinking a red LED three times, the required module for Quest 2 may be a mic module 96 capable of inputting the sound, and the required module for Quest 3 may be a gyro module 97 capable of measuring a tilt of the module, and an acceleration and an angular velocity for each axis in order to perform the quest of sweeping the sword in the figure-8 shape.

In this case, the next quest coming after the current quest is determined by the surplus module combined by the user among a number of preliminary quests as described above.

For example, when a vibration module 98 is combined as the surplus module, a quest in which the vibration module 98 is included as the required module may be selected as the next quest. As a result, when there is a quest related to vibration, such as "The vibration is generated by stamping a foot on a cliff among the plurality of preliminary quests, the corresponding quest may be progressed as the next quest.

Meanwhile, according to yet another embodiment of the present invention, the next quest may be selected based on the module sequence output from topology and/or programmed source code other than the surplus module. In other words, when the next quest is selected based on the module sequence output from the topology and/or the programmed source code, an intention of the corresponding surplus module may be changed depending on which module even the same surplus module is attached to. For example, when the motor module which is the surplus module is coupled next to an infrared sensor module, the motor module is determined "to roll up by sensing an obstacle" to select a quest related to riding a vehicle (moving means) may be selected as the next quest.

When the topology is described in detail, the main module 90 may collect topology information (hereinafter, also referred to as "module topology information"). Referring to FIG. 12, module topology information 1048 may basically include unique information (module ID) 1048-1 of the modules in the module assembly 1, tier information 1048-2, lower connection module information 1048-3, a connection ranking 1048-4, and a module category 1048-6. The module topology information 1048 may additionally include a connection direction 1048-5.

The module unique information 1048-1 represents module IDs 1046 of connected modules included in the module assembly. In this case, the module unique information 1048-1 may be a module unique identifier such as a Universally Unique Identifier (UUID) and may be a temporary ID assigned during connection in the control module 10.

The tier information 1048-2 means a distance from the control module 10 and is determined by counting modules connected on a shortest path from the control module 10 up to the corresponding module. However, in the case of a module attached to a semantic module among the modules, by assuming the semantic module as the control module 10, the tier information 1048-2 may be determined as a distance from the semantic module or (tier designed in the semantic module)+(distance from the semantic module)−1. Alternatively, when the module is attached to the semantic module, a large weight is assigned and importance of the module attached to the semantic module may be emphasized.

In a case where it is difficult to directly connect the semantic module to the control module 10, such as influencing the size of the module or another module, the semantic module is a module for displaying, by hardware, that the semantic module is a module which is important in source code recommendation or module recommendation in a developer program.

For example, when the user intends to manufacture the model assembly serving as a mini car by assembling the module, a motor module or a wheel module has an important meaning, but is further from the control module 10 due to the size of the wheel, etc., and as a result, it may be difficult that the motor module or the wheel module is significant. In this case, when the motor module or the wheel module is connected to the semantic module, an intention of the user is reflected on the topology, and as a result, recommendation of the source code or the added or replaced module may be closer to the intention of the user.

The lower connection module information 1048-3 represents module unique information of a module having a lower tier (further from the control module 10) than the corresponding module. By default, when each module stores information of modules connected to the corresponding module and is connected to the control module 10, each module may provide to the control module 10 information of a module connected to a lower priority.

The connection ranking 1048-4 which represents an order to access the control module 10 represents information which becomes a basis when the recommendation server 2 recommends the source code and the module. Since the method for determining the connection ranking 1048-4 is described in the description part for FIG. 5, a description of a common part will be omitted. When a module group constituted by a plurality of modules which is already combined is combined to the control module 10, the same common connection ranking 1048-7 may be assigned to the module group.

The connection direction 1048-5 as additional information represents information indicating to which port the lower connection module and the higher connection module are physically connected. For example, when there are a communication module and a gyroscope sensor module, an electromagnetic wave of the communication module may influence sensing of the gyroscope sensor module, and as a result, the communication module and the gyroscope sensor module may be mutually disposed at locations not influencing each other as possible based on the connection direction 1048-4. In this case, the connection direction information 1048-4 and the tier information may be utilized.

Last, the module category 1048-6 represents information to classify the modules according to the function of the module. For example, various sensors including a microphone, a temperature sensor, a gyroscope sensor, an infrared sensor, an ultrasonic sensor, and the like and modules that collects input electrical signals, such as a dial, a button, a keyboard, and the like may be classified to 'input'. Alternatively, an actuator such as the motor, a light emitting diode (LED), a liquid crystal display device, and a speaker may be classified to 'output'. Further, various network modules (LTE, Bluetooth, etc.) may be classified to 'communication'. Further, a module which may include the microprocessor and execute an application programmed by the user terminal 3 may be classified to 'control'. When recommending the module, the server may determine whether the recommended module is a replaceable module or an addable module based on the category information.

Further, in the present invention, the module sequence output from the programmed source code may be defined as a module sequence determined as the module topology information included in the module is programmed according to a module assembling sequence and programmed in the form of the source code.

Hereinafter, the source code according to an embodiment of the present invention will be described with reference to FIG. 11.

FIG. 11 is an exemplary diagram of a source code generated by assembling a module assembly according to an embodiment of the present invention. The source code illustrated in FIG. 11 is just exemplarily illustrated for convenience of description and is not a source code actually related to module assembling.

Referring to FIG. 11, a coding program 1200 may automatically generate a source code 1203 for module assembly information 1201 of the user for the first scene and module assembly information 1202 of the user for the second scene.

Alternatively, the coding program may be displayed in a partial region of the display unit 27 of the user terminal 2. As a result, the user may set a condition for the assembled module when assembling the module through coding simultaneously with assembling for the quest performing information related to each scene. Referring to the example of FIG. 10 above, when the user combines the LED module in order to express that the dragon belches out the red fire three times, the source code may be generated for a color to be output from the LED module through the coding program and the source code may be input so that the LED module is turned on/off three times so as to blink the color to be output three times.

As such, according to the present invention, the reader receives a feedback of source code information for an assembled module while performing an event element for the story to increase an interest level for coding and guarantee a learning result at a predetermined level or higher.

According to the present invention, when a reader assembles a module to produce various stories, an event element is added to evaluate an achievement speed and an achievement rate for an event, thereby assisting enhancing a concentration and enhancing quickness by increasing an interest of the reader.

According to the present invention, in progress of a story, visuals, hearings, etc., are output through a module to increase an understanding level of the reader for the story and the reader variously autonomously produces the story to cause continuous interest by increasing a participation level of the reader.

Combinations of each block of the accompanying block diagram and each step of the flowchart are constituted by firmware, software, or hardware. The combinations may be performed by an algorithm or computer program instructions. Since the algorithm or computer program instructions may be mounted on a universal computer, a special computer or a processor of other programmable digital signal processing device, the instructions performed by the computer or a processor of other programmable data processing equipment generate a means of performing functions described in each block of the block diagram or each step of the flowchart.

Since the algorithm or computer program instructions may also be stored in a computer usable or computer readable memory which may direct a computer or other programmable data processing equipment in order to implement a function in a specific scheme, the instructions stored in the computer usable or computer readable memory can also produce manufacturing items including an instruction means performing a function described in each block of the block diagram or each step in the flowchart. Since the computer program instructions can also be mounted on the computer or other programmable data processing equipment, instructions that perform the computer or other programmable data processing equipment by generating a processor executed by the computer as a series of operational steps are performed on the computer or other programmable data processing equipment can provide steps for executing the functions described in each block of the block diagram or each step in the flowchart.

Further, each block or each step may represent a part of a module, a segment, or a code that includes one or more executable instructions for executing a specified logical function(s). It should also be noted that in some alternative embodiments, the functions mentioned in the blocks or steps may occur out of order. For example, two successive blocks or steps illustrated may in fact be performed substantially concurrently or the blocks or steps may be sometimes performed in a reverse order according to the corresponding function.

Further, the system according to the present invention may be implemented as a computer readable code in a computer readable recording medium. The computer readable recording medium includes all kinds of recording devices storing data which may be deciphered by a computer system. The computer readable recording medium includes magnetic storage media (e.g., a ROM, a floppy disk, a hard disk, and the like) and optical reading media (e.g., a CD-ROM, a DVD, and the like). Further, the computer readable recording media may store and execute codes which may be distributed in the computer system connected through a network and read by a computer in a distribution method.

What is claimed is:

1. A reader participation type electronic book system, using a module including a module assembly configured by assembling a plurality of modules, and a user terminal connected to the module assembly through a network, the reader participation type electronic book comprising:
   a story providing unit transmitting an electronic book database including at least one story to the user terminal;
   an assembly information reception unit receiving module assembly information based on at least one quest performing information generated with respect to scenes constituting the story and generated for a story progress; and
   a score generation unit generating a score for module assembling of a user for each scoring condition with respect to the module assembly information.

2. The reader participation type electronic book system of claim 1, wherein the quest performing information includes a description forming the story and an instruction to be solved by module coupling and a required module coupled to perform a quest is previously determined according to the instruction.

3. The reader participation type electronic book system of claim 1, wherein the quest performing information includes an event element which is irrespective of the progress of the story and generated by a module which is arbitrarily selected and assembled by the user.

4. The reader participation type electronic book system of claim 3, further comprising:
   a hidden story generation unit generating a hidden story which is irrespective of the story by the event element.

5. The reader participation type electronic book system of claim 1, wherein the score generation unit generates the score according to a predetermined weight with respect to the scoring condition.

6. The reader participation type electronic book system of claim 1, wherein the scoring condition includes at least one of a time spent when the user assembles the module assembly, module information for the type of connected module, whether the module operates, activated story information, whether to implement a code, quickness, whether the modules cooperate with each other, and a code implementation time.

7. The reader participation type electronic book system of claim 6, wherein the activated story information is a length of a story line generated based on module assembling.

8. The reader participation type electronic book system of claim 1, wherein the score generation unit adds the score by giving a weight for each item with respect to the scoring condition.

9. The reader participation type electronic book system of claim 1, wherein the story providing server sets a reference time for the module assembling differently so as to be in proportion to a difficulty based on the difficulty of the story.

10. The reader participation type electronic book system of claim 3, further comprising:
    an event element generation unit receiving mission performing information for determining whether the user performs a mission for the event element; and an event information reception unit receiving event performing information of the user for the event element.

11. The reader participation type electronic book system of claim 1, wherein the story providing server further includes a source code generation unit generating a source code based on the module assembly information.

12. The reader participation type electronic book system of claim 1, wherein the module assembly includes at least one of an input module and an output module,
    the input module is at least one of an environment module, a button module, a gyroscope module, a mic module, an infrared module, a dial module, and an ultrasound module, and
    the output module is at least one of an LED module, a speaker module, a display module, a motor controller module, and a motor module.

13. The reader participation type electronic book system of claim 2, wherein a next quest output after the quest is determined by considering at least one of a surplus module combined by the user, and module sequence from topology and/or programmed source code irrespective of the quest.

14. The reader participation type electronic book system of claim 13, wherein when the module is assembled with respect to the next quest, the module is assembled after initializing module assembling for a previous quest performed just before the next quest.

15. The reader participation type electronic book system of claim 1, wherein the network is connected wiredly and/or wirelessly.

16. The reader participation type electronic book system of claim 1, wherein each of the plurality of modules includes module unique information which is a module unique identifier and the module assembly includes at least one set unique information for distinguishing the user.

17. An operation method of an electronic book system using a module, the operation method comprising:
  transmitting, by a story providing unit, an electronic book database including at least one story to a user terminal;
  receiving, by an assembly information reception unit, module assembly information based on at least one quest performing information generated with respect to scenes constituting the story and generated for a story progress; and
  generating, by a score generation unit, a score for module assembling of a user for each scoring condition with respect to the module assembly information.

18. The operation method of claim 17, further comprising:
  receiving, by an event element generation unit, mission performing information for determining whether the user performs the mission for an event element generated by a module arbitrarily selected and assembled by the user irrespective of the progress of the story.

19. The operation method of claim 17, further comprising:
  receiving, by an event information reception unit, event performing information of the user for an event element.

20. The operation method of claim 17, further comprising:
  the quest performing information includes a description forming the story and an instruction to be solved by module coupling and a required module coupled to perform a quest related to the instruction is predetermined.

21. The operation method of claim 20, wherein a next quest output after the quest is determined by a surplus module coupled by a user irrespective of the quest.

22. The operation method of claim 21, wherein the next quest is determined by considering at least one of module sequence output from topology and/or programmed source code.

23. The operation method of claim 18, further comprising:
  providing a plurality of endings by the required module, the surplus module, and the event element.

24. The operation method of claim 17, wherein the module assembly includes at least one of an input module and an output module, the input module is at least one of an environment module, a button module, a gyroscope module, a mic module, an infrared module, a dial module, and an ultrasound module, and the output module is at least one of an LED module, a speaker module, a display module, a motor controller module, and a motor module.

* * * * *